(12) United States Patent
Yu et al.

(10) Patent No.: US 11,231,094 B2
(45) Date of Patent: Jan. 25, 2022

(54) STROKE-LIMITING CONTROL ASSEMBLY AND OPERATING METHOD THEREOF

(71) Applicant: HANGZHOU HENGHONG MACHINERY CO., LTD., Hangzhou (CN)

(72) Inventors: Laiming Yu, Hangzhou (CN); Guozhong Wang, Hangzhou (CN); Yilong Shao, Hangzhou (CN); Jiangqiang Lu, Hangzhou (CN); Feng Tian, Hangzhou (CN); Lin Chen, Hangzhou (CN)

(*) Notice: Subject to any disclaimer, the term of this patent is extended or adjusted under 35 U.S.C. 154(b) by 312 days.

(21) Appl. No.: 16/282,296

(22) Filed: Feb. 22, 2019

(65) Prior Publication Data
US 2020/0056687 A1 Feb. 20, 2020

(30) Foreign Application Priority Data
Aug. 15, 2018 (CN) .......................... 201810926818.4

(51) Int. Cl.
*F16H 25/20* (2006.01)
*F03G 1/08* (2006.01)
*F16H 1/06* (2006.01)

(52) U.S. Cl.
CPC ........... *F16H 25/2015* (2013.01); *F03G 1/08* (2013.01); *F16H 1/06* (2013.01)

(58) Field of Classification Search
None
See application file for complete search history.

(56) References Cited

U.S. PATENT DOCUMENTS

| | | | | |
|---|---|---|---|---|
| 826,858 A * | 7/1906 | Jones | ................... | F16H 25/2015 192/141 |
| 3,461,747 A * | 8/1969 | Dahlberg | ................. | D01H 1/36 74/828 |
| 4,191,340 A * | 3/1980 | Kubanek | ............ | A01K 89/0165 242/223 |
| 2021/0039157 A1* | 2/2021 | Pellenc | ................... | B21F 15/04 |

* cited by examiner

*Primary Examiner* — William Kelleher
*Assistant Examiner* — Gregory T Prather
(74) *Attorney, Agent, or Firm* — Bayramoglu Law Offices LLC

(57) ABSTRACT

The present disclosure relates to the field of stroke-controlling mechanism, and discloses a stroke-limiting control assembly and an operating method. The stroke-limiting control assembly comprises a housing and a film winding. A transmission input gear, a transmission gear, a guide wheel, and a spring box that can be rotated to reset by an elastic force are rotatably connected within the housing. When a moving component moves to an end of an upper stroke, a first metal needle abuts a first proximity switch. When the movable component moves to an end of a lower stroke, a second metal needle abuts against a second proximity switch. At least a stroke-limiting control assembly is provided which enables simplification of a product requiring stroke-limiting, such as an electric jack or an electric support leg, by arranging the proximity switches outside a screw nut lifting unit in the electric jack or the electric support leg.

15 Claims, 3 Drawing Sheets

STROKE-LIMITING CONTROL ASSEMBLY AND OPERATING METHOD THEREOF

CROSS-REFERENCE TO RELATED APPLICATIONS

This application claims priority to Chinese Patent Application No. 201810926818.4 with a filing date of Aug. 15, 2018. The content of the aforementioned application, including any intervening amendments thereto, are incorporated herein by reference.

TECHNICAL FIELD

The present disclosure relates to the field of stroke-controlling mechanism, and more particularly, to a stroke-limiting control assembly and operating method thereof.

BACKGROUND

Electric jacks and electric support legs are often used in the lifting of large vehicles as an auxiliary support unit and they are often mounted on the frames of vehicles.

In addition, some of the electric jacks and electric support legs of prior arts have not been equipped with a stroke-limiting structure. This may cause excessive jacking or contraction of a screw nut lifting unit in the electric jack or the electric support leg, resulting in jamming or structural instability.

Besides, the two proximity switches in stroke-limiting structures of the prior arts are directly disposed at the two extreme positions of the screw nut lifting assembly in the electric jack or the electric support leg. The internal structure and the circuit routing of the electric jack or the electric support leg may become complicated and improvements is needed thereupon.

SUMMARY

An objective of the present disclosure is to solve some of the problems of the prior art. One technical problem to be solved is to provide a stroke-limiting control assembly which enables simplification of electric jacks and electric support legs by arranging the proximity switches outside the screw nut lifting unit in electric jacks and electric support legs.

To solve the problem, a stroke-limiting control assembly of the present disclosure comprises a housing and a film winding. A transmission input gear, a transmission gear, a guide wheel, and a spring box that can be rotated to reset by an elastic force are rotatably connected within the housing. The transmission gear is engaged with the transmission input gear. The transmission gear is fixedly connected with a reel. The reel is coaxial with the transmission gear. One end of the film winding is winded on the reel. The other end of the film winding is winded on the spring box. The spring box comprises a spring. One side of the film winding is overlapped on the guide wheel. A first metal needle and a second metal needle are respectively fixed at two ends of the film winding. The housing is also fixedly connected with a first proximity switch and a second proximity switch. When a moving component moves to an end of an upper stroke, the first metal needle abuts the first proximity switch. When the movable component moves to an end of a lower stroke, the second metal needle abuts against the second proximity switch.

At least the following advantages are achieved by using the embodiment described above: the moving component may be an electric jack or an electric support leg. After installing the stroke-limiting control assembly of the present application on the electric jack or the electric support leg of a product, the driving unit of the electric jack or the electric support leg is drivingly connected to the transmission input gear of the present application. The driving unit drives the electric jack or the electric support leg to lift or contract, and then drives the transmission input gear to rotate. Under the actuation of the transmission input gear, the transmission gear, the film winding, the guide wheel the reel, and the spring box which can be rotated to reset with an elastic force, the reel and the spring box can take turns to wind and unwind the film winding. That is to say, the spring box can move back and forth therebetween to enable winding of the film winding by the reel and the spring box. When a moving component moves to an end of an upper stroke, the first metal needle abuts the first proximity switch. When the movable component moves to an end of a lower stroke, the second metal needle abuts against the second proximity switch. It is possible to achieve a limit for extreme positions between the large strokes in a limited housing space, and in one aspect to ensure the compactness of the stroke limit device. In addition, the spring box is provided with a spring. The spring box can be rotated to reset by an elastic force. Under the action of the spring, the spring box keeps the film winding in a stretched state no matter the traveling direction to ensure the stability of the film winding during operation. Without this technical feature, the film winding will be softened and knotted. Furthermore, after adopting the stroke-limiting control assembly of the present application, the first proximity switch and the second proximity switch, which are originally required to be disposed inside the product, can be placed outside the product to simplify the structure of the product. The installation and wire routing of the first and second proximity switches are also facilitated.

In an embodiment, the first proximity switch and the second proximity switch are arranged side by side. The number of the guide wheels is two. One of the guide wheels is located at a side of the first proximity switch. The other guide wheel is located at a side of the second proximity switch which is away from the first proximity switch. This means that the first and second proximity switches are arranged between the two guide wheels. The film winding between the two guide wheels exhibits a stronger stretching force to ensure a stable contact between the first and second metal needles and the first and second proximity switches.

In an embodiment, the reel is located at one side of the transmission gear, and a limiting groove for the film winding during a winding motion is formed between the side surface of the transmission gear and the inner wall surface of the housing. In this way, the limiting groove aids the winding of the film winding and the knotting caused by the deviation of the film winding is avoided.

In an embodiment, two retaining holes for giving space to the first proximity switch and the second proximity switch are provided on the side wall of the housing, and the ends of the first proximity switch and the second proximity switch are respectively inserted in the retaining holes. The external wire connection of the first proximity switch and the second proximity switch are enabled by the embodiment.

In an embodiment, bumps are arranged on the side walls of the two retaining holes respectively, and the bumps are respectively abutted against the sides of the first proximity switch and the second proximity switch respectively. In this way, when assembling the first proximity switch and the second proximity switch, the first proximity switch and the second proximity switch can be firstly engaged in the retaining holes to abut with the bumps and predetermine the positions, thereby improving assembly efficiency.

An operating method of a stroke-limiting control assembly is also disclosed which comprises the steps of: when the moving component moves in the direction towards the end of the upper stroke, operating a driving unit in the moving component to drive the transmission input gear of the stroke-limiting control assembly to rotate in a forward direction, driving the transmission gear to rotate with the transmission input gear, driving the reel to rotate with the transmission gear, driving the film winding to move in a first direction with the reel, keeping the film winding in a stretched state by using the spring of the spring box, and when the moving component reaches the end of the upper stroke, abutting the first metal needle against the first proximity switch to stop the moving component; and when the moving component moves in the direction towards the end of the lower stroke, operating a driving unit in the moving component to drive the transmission input gear of the stroke-limiting control assembly to rotate in a backward direction, driving the transmission gear to rotate with the transmission input gear, driving the reel to rotate with the transmission gear, rotating and resetting the spring box by the spring, driving the film winding to move in a second direction with the spring box, keeping the film winding in a stretched state by using the spring of the spring box, and when the moving component reaches the end of the lower stroke, abutting the second metal needle against the second proximity switch to stop the moving component.

At least the following advantages are achieved by using the method described above: the moving component may be an electric jack or an electric support leg. After installing the stroke-limiting control assembly of the present application on the electric jack or the electric support leg of a product, the driving unit of the electric jack or the electric support leg is drivingly connected to the transmission input gear of the present application. The driving unit drives the electric jack or the electric support leg to lift or contract, and then drives the transmission input gear to rotate. Under the actuation of the transmission input gear, the transmission gear, the film winding, the guide wheel, the reel, and the spring box which can be rotated to reset with an elastic force, the reel and the spring box can take turns to wind and unwind the film winding. That is to say, the spring box can move back and forth therebetween to enable winding of the film winding by the reel and the spring box. When a moving component moves to an end of an upper stroke, the first metal needle abuts the first proximity switch. When the movable component moves to an end of a lower stroke, the second metal needle abuts against the second proximity switch. It is possible to achieve a limit for extreme positions between the large strokes in a limited housing space, and in one aspect to ensure the compactness of the stroke limit device. In addition, the spring box is provided with a spring. The spring box can be rotated to reset by an elastic force. Under the action of the spring, the spring box keeps the film winding in a stretched state no matter the traveling direction to ensure the stability of the film winding during operation. Without this technical feature, the film winding will be softened and knotted.

REFERENCE NUMBERS 1, housing; 2, film winding; 3 transmission input gear; 4, transmission gear; 5, guide wheels; 6, spring box; 7, reel; 8, spring; 9, first metal needle; 10, second metal needle; 11, first proximity switch; 12 second proximity switch; 13, retaining hole; 14, bump; 15, limiting groove.

DETAILED DESCRIPTION

The inventive concepts of the present disclosure will be described below using terms commonly used by those skilled in the art to convey the substance of their work to others skilled in the art. However, these inventive concepts may be embodied in many different forms and thus should not be considered as limited to the embodiments described herein. These embodiments are provided to render the disclosure more thorough and complete, and to fully convey the scope of the disclosure to those skilled in the art. It should also be noted that these embodiments are not mutually exclusive. Components, steps or elements from one embodiment may be assumed to exist or be used in another embodiment. The particular embodiments shown and described may be substituted for a variety of alternatives and/or equivalent implementations without departing from the scope of the embodiments of the present disclosure. This application is intended to cover any adaptations or variations of the embodiments discussed herein. It will be apparent to those skilled in the art that the alternative embodiments may be practiced using only some of the described aspects. The specific figures, materials, and configurations are described herein for purposes of illustration, and may be practiced by those skilled in the art without the specific details. In other instances, well-known features may be omitted or simplified so as not to obscure the illustrative embodiments.

Moreover, the terms "first," "second," and "third" are used for descriptive purposes only and are not to be construed as indicating or implying relative importance. In the description of the present invention, it should be noted that, unless otherwise specifically defined, the terms "provided", "installed", "connected", and "coupled" are to be understood broadly. For example, it and may be a fixed connection, a detachable connection, or an integral connection; it can be a mechanical connection or an electrical connection; it can be directly connected or indirectly connected through an intermediate medium, it can be the internal connection of two elements. The term "fixed" can be used to specify a bolted connection and/or a screwed connection and/or a snap fit and/or a weld, and the specific meaning of the above terms in the present invention can be understood by one of ordinary skill in the art.

Figure 1:
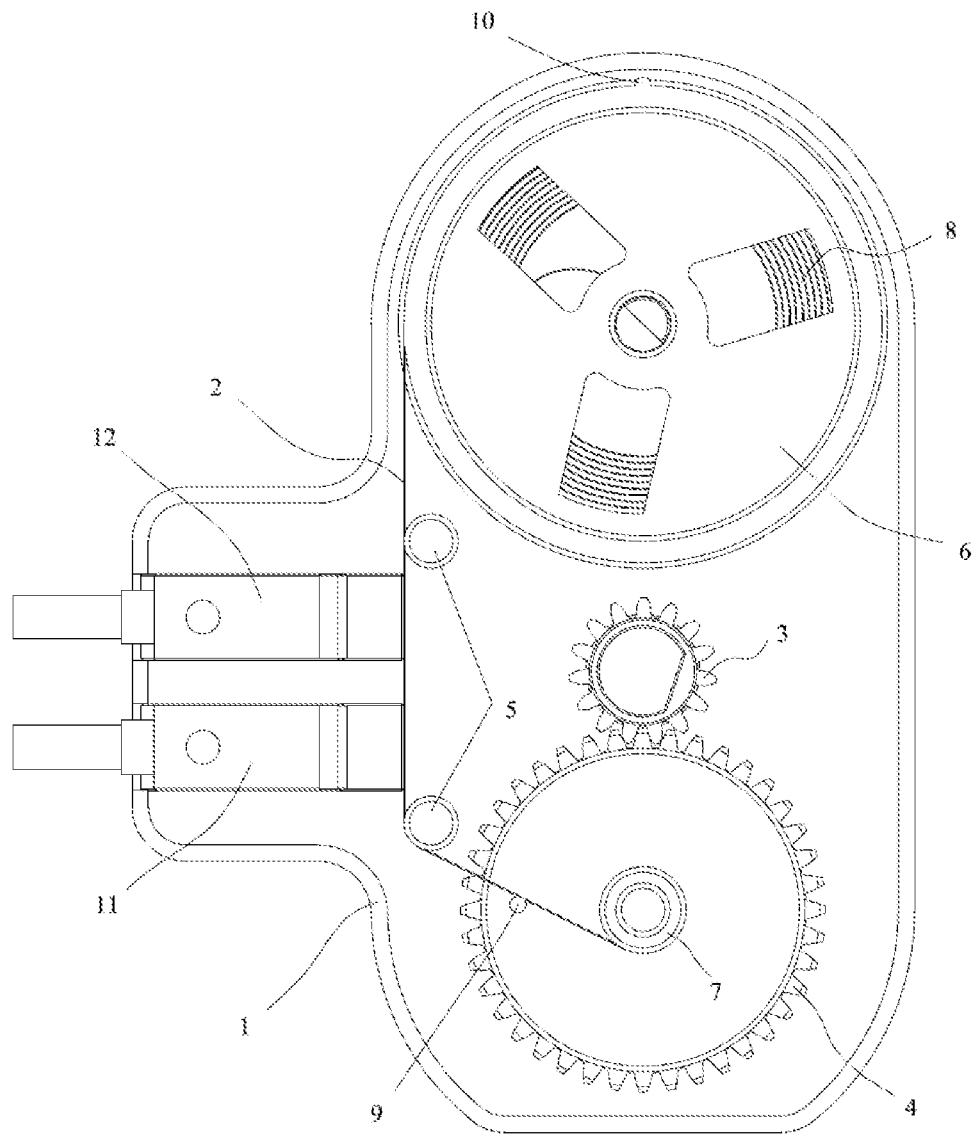
FIG. 1 is a schematic drawing of the stroke-limiting control assembly with an upper part of the housing hidden.
Figure 2:
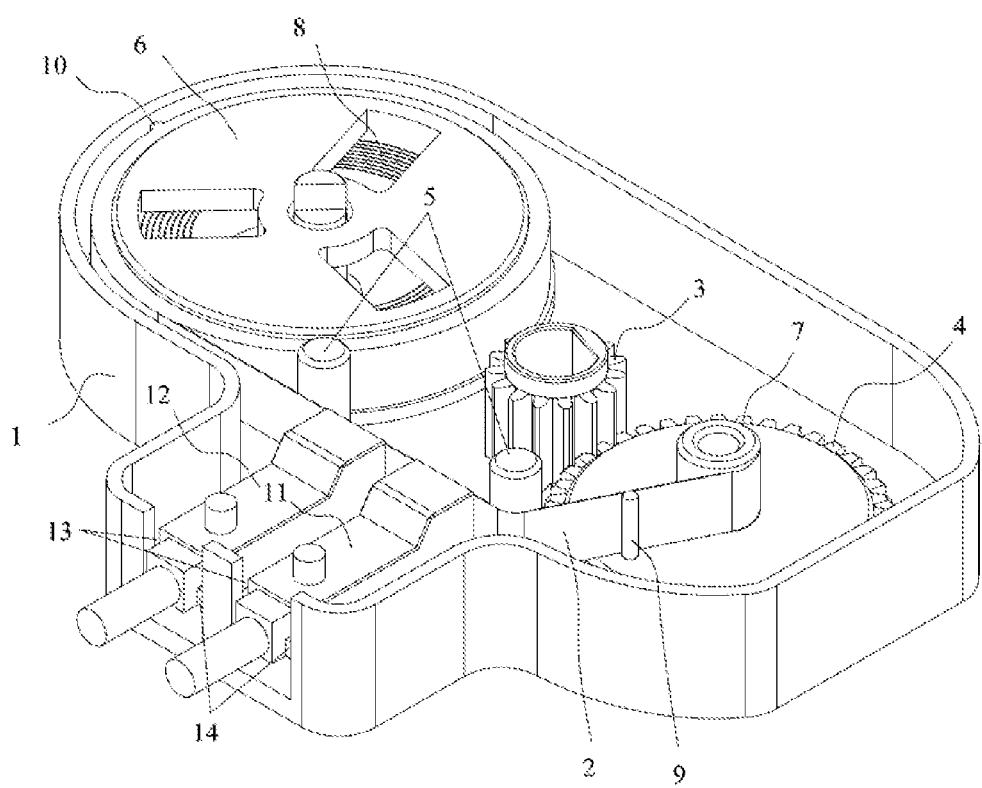
FIG. 2 is a structural schematic of the stroke-limiting control assembly with an upper part of the housing hidden.
Figure 3:
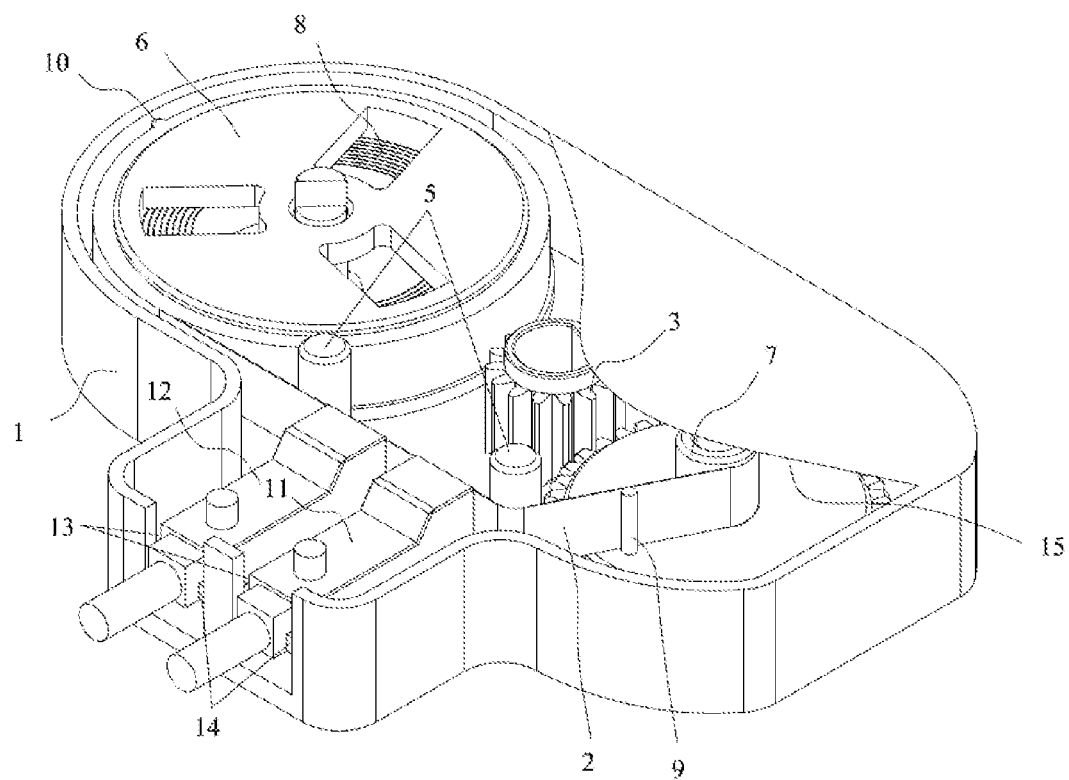
FIG. 3 is a structural schematic of the stroke-limiting control assembly with a portion of an upper part of the housing hidden.

As shown in FIGS. 1-3, a stroke-limiting control assembly of en embodiment comprises a housing 1 and a film winding 2. A transmission input gear 3, a transmission gear 4, a guide wheel 5, and a spring box 6 that can be rotated to reset by an elastic force are rotatably connected within the housing 1. The transmission gear 4 is engaged with the transmission input gear 3. The transmission gear 4 is fixedly connected with a reel 7. The reel 7 is coaxial with the transmission gear 4. One end of the film winding 2 is winded on the reel 7. The other end of the film winding 2 is winded on the spring box 6. The spring box 6 comprises a spring 8. One side of the film winding 2 is overlapped on the guide wheel 5. A first metal needle 9 and a second metal needle 10 are respectively fixed at two ends of the film winding 2. The housing 1 is also fixedly connected with a first proximity switch 11 and a second proximity switch 12. When a moving component moves to an end of an upper stroke, the first metal needle 9 abuts the first proximity switch 11. When the movable component moves to an end of a lower stroke, the second metal needle 10 abuts against the second proximity switch 12.

The moving component may be an electric jack or an electric support leg. After installing the stroke-limiting control assembly of the present application on the electric jack or the electric support leg of a product, the driving unit of the electric jack or the electric support leg is drivingly connected to the transmission input gear 3 of the present application. The driving unit drives the electric jack or the electric support leg to lift or contract, and then drives the transmission input gear 3 to rotate. Under the actuation of the transmission input gear 3, the transmission gear 4, the film winding 2, the guide wheel 5, the reel 7, and the spring box 6 which can be rotated to reset with an elastic force, the reel 7 and the spring box 6 can take turns to wind and unwind the film winding 2. That is to say, the spring box 6 can move back and forth therebetween to enable winding of the film winding 2 by the reel 7 and the spring box 6. When a moving component moves to an end of an upper stroke, the first metal needle abuts the first proximity switch. When the movable component moves to an end of a lower stroke, the second metal needle abuts against the second proximity switch. It is possible to achieve a limit for extreme positions between the large strokes in a limited space of the housing 1, and in one aspect to ensure the compactness of the stroke limit device. In addition, the spring box 6 is provided with a spring 8. The spring box 6 can be rotated to reset by an elastic force. Under the action of the spring 8, the spring box 6 keeps the film winding 2 in a stretched state no matter the traveling direction to ensure the stability of the film winding 2 during operation. Without this technical feature, the film winding 2 will be softened and knotted. Furthermore, after adopting the stroke-limiting control assembly of the present application, the first proximity switch and the second proximity switch, which are originally required to be disposed inside the product, can be placed outside the product to simplify the structure of the product. The installation and wire routing of the first and second proximity switches are al so facilitated.

In an embodiment, the first proximity switch 11 and the second proximity switch 12 are arranged side by side. The number of the guide wheels 5 is two. One of the guide wheels 5 is located at a side of the first proximity switch 11. The other guide wheel 5 is located at a side of the second proximity switch 12 which is away from the first proximity switch 11. This means that the first and second proximity switches 11, 12 are arranged between the two guide wheels 5. The film winding 2 between the two guide wheels 5 exhibits a stronger stretching force to ensure a stable contact between the first and second metal needles 9, 10 and the first and second proximity switches 11, 12.

The first proximity switch 11 and the second proximity switch 12 are connected to an electronic control system. When the first metal needle 9 abuts the first proximity switch 11, the electronic control system is powered off. When the second metal needle 10 abuts the second proximity switch 12, the electronic control system is powered off. This is a well-known control method of the proximity switches, and its principle is not described here.

In an embodiment, the reel 7 is located at one side of the transmission gear 4, and a limiting groove 15 for the film winding 2 during a winding motion is formed between the side surface of the transmission gear 4 and the inner wall surface of the housing 1. In this way, the limiting groove 15 aids the winding of the film winding 2 and the knotting caused by the deviation of the film winding 2 is avoided.

In an embodiment, two retaining holes 13 for giving space to the first proximity switch 11 and the second proximity switch 12 are provided on the side wall of the housing 1, and the ends of the first proximity switch 11 and the second proximity switch 12 are respectively inserted in the retaining holes 13. The external wire connection of the first proximity switch 11 and the second proximity switch 12 are enabled by the embodiment.

In an embodiment, bumps 14 are arranged on the side walls of the two retaining holes 13 respectively, and the bumps 14 are respectively abutted against the sides of the first proximity switch 11 and the second proximity switch 12 respectively. In this way, when assembling the first proximity switch 11 and the second proximity switch 12, the first proximity switch 11 and the second proximity switch 12 can be firstly engaged in the retaining holes 13 to abut with the bumps 14 and predetermine the positions, thereby improving assembly efficiency.

The driving unit may be connected to the transmission input gear 3. It refers to that a rotating shaft of the driving unit may be directly connected to the transmission input gear 3, or the driving unit and the transmission input gear 3 may be connected through a reduction gear set. An operating method of a stroke-limiting control assembly according to an embodiment is also disclosed which comprises the steps of when the moving component moves in the direction towards the end of the upper stroke, operating a driving unit in the moving component to drive the transmission input gear 3 of the stroke-limiting control assembly to rotate in a forward direction, driving the transmission gear 4 to rotate with the transmission input gear 3, driving the reel 7 to rotate with the transmission gear 4, driving the film winding 2 to move in a first direction with the reel 7, keeping the film winding 2 in a stretched state by using the spring 8 of the spring box 6, and when the moving component reaches the end of the upper stroke, abutting the first metal needle 9 against the first proximity switch 11 to stop the moving component; and when the moving component moves in the direction towards the end of the lower stroke, operating a driving unit in the moving component to drive the transmission input gear 3 of the stroke-limiting control assembly to rotate in a backward direction, driving the transmission gear 4 to rotate with the transmission input gear 3, driving the reel 7 to rotate with the transmission gear 4, rotating and resetting the spring box 6 by the spring 8, driving the film winding 2 to move in a second direction with the spring box 6, keeping the film winding 2 in a stretched state by using the spring 8 of the spring box 6, and when the moving component reaches the end of the lower stroke, abutting the second metal needle 10 against the second proximity switch 12 to stop the moving component.

As the driving unit drives the electric jack or the electric support leg to lift or contract, it also drives the transmission input gear 3 to rotate. Under the actuation of the transmission input gear 3, the transmission gear 4, the film winding 2, the guide wheel 5, the reel 7, and the spring box 6 which can be rotated to reset with an elastic force, the reel 7 and the spring box 6 can take turns to wind and unwind the film winding 2. That is to say, the spring box 6 can move back and forth therebetween to enable winding of the film winding 2 by the reel 7 and the spring box 6. When a moving component moves to an end of an upper stroke, the first metal needle abuts the first proximity switch. When the movable component moves to an end of a lower stroke, the second metal needle abuts against the second proximity switch. It is possible to achieve a limit for extreme positions between the large strokes in a limited space of the housing 1, and in one aspect to ensure the compactness of the stroke limit device. In addition, the spring box 6 is provided with a spring 8. The spring box 6 can be rotated to reset by an elastic force. Under the action of the spring 8, the spring box 6 keeps the film winding 2 in a stretched state no matter the traveling direction to ensure the stability of the film winding 2 during operation. Without this technical feature, the film winding 2 will be softened and knotted.

In the above method, when the moving component moves in the direction towards the end of the upper stroke, the rotation direction of the transmission input gear is defined as forward, and when the moving component moves in the direction towards the end of the lower stroke, the rotation direction of the transmission input gear is defined as backward. Specifically, whether it is clockwise or counterclockwise when rotating the transmission input gear forward or backward depends on the situation.

Some advantages achieved by the method are that: the moving component may be an electric jack or an electric support leg. The excessive jacking or contraction of a screw nut lifting unit in the electric jack or the electric support leg, as well as jamming or structural instability which may result from the excessive jacking or contraction can be prevented. It is possible to achieve a limit for extreme positions between the large strokes in a limited space of the housing 1 with the aid of the transmission of the transmission input gear 3, a double gear assembly, and a ring gear with internal teeth. On one hand, the structural rigidity of the stroke-limiting control assembly is ensured, and on the other hand, the stability of the transmission is also ensured since the transmission is a directly engagement.

The above description is only a preferred embodiment of the present invention, and is not intended to limit the scope of the present invention. Those skilled in the art will be able to practices other implementations of the technical solutions and technical concepts of the present invention. Corresponding changes are intended to fall within the scope of the appended claims.

We claim:

1. A stroke-limiting control assembly, comprising: a housing and a film winding, wherein a transmission input gear, a transmission gear, a guide wheel, and a spring box that can be rotated to reset by an elastic force are rotatably connected within the housing; the transmission gear is engaged with the transmission input gear; the transmission gear is fixedly connected with a reel; the reel is coaxial with the transmission gear; one end of the film winding is winded on the reel; the other end of the film winding is winded on the spring box; the spring box comprises a spring; one side of the film winding is overlapped on the guide wheel; a first metal needle and a second metal needle are respectively fixed at two ends of the film winding; the housing is also fixedly connected with a first proximity switch and a second proximity switch.

2. The stroke-limiting control assembly of claim 1, wherein the first proximity switch and the second proximity switch are arranged side by side, the number of the guide wheels is two, one of the guide wheels is located at a side of the first proximity switch, and the other guide wheel is located at a side of the second proximity switch which is away from the first proximity switch.

3. An operating method of a stroke-limiting control assembly according to claim 2, comprising the steps of:
   a driving the transmission input gear of the stroke-limiting control assembly to rotate in a forward direction;
   driving the transmission gear to rotate with the transmission input gear;
   driving the reel to rotate with the transmission gear;
   driving the film winding to move in a first direction with the reel; and
   keeping the film winding in a stretched state by using the spring of the spring box.

4. An operating method of a stroke-limiting control assembly according to claim 2, further comprising the steps of:
   driving the transmission input gear of the stroke-limiting control assembly to rotate in a backward direction;
   driving the transmission gear to rotate with the transmission input gear;
   driving the reel to rotate with the transmission gear;
   rotating and resetting the spring box by the spring;
   driving the film winding to move in a second direction with the spring box; and
   keeping the film winding in a stretched state by using the spring of the spring box.

5. The stroke-limiting control assembly of claim 1, wherein the reel is located on one side of the transmission gear, and a side of the transmission gear and an inner wall surface of the housing form a limiting groove for a winding movement of the film winding.

6. An operating method of a stroke-limiting control assembly according to claim 5, comprising the steps of:
   a driving the transmission input gear of the stroke-limiting control assembly to rotate in a forward direction;
   driving the transmission gear to rotate with the transmission input gear;
   driving the reel to rotate with the transmission gear;
   driving the film winding to move in a first direction with the reel; and
   keeping the film winding in a stretched state by using the spring of the spring box.

7. An operating method of a stroke-limiting control assembly according to claim 5, further comprising the steps of:
   driving the transmission input gear of the stroke-limiting control assembly to rotate in a backward direction;
   driving the transmission gear to rotate with the transmission input gear;
   driving the reel to rotate with the transmission gear;
   rotating and resetting the spring box by the spring;
   driving the film winding to move in a second direction with the spring box; and
   keeping the film winding in a stretched state by using the spring of the spring box.

8. The stroke-limiting control assembly of claim 1, wherein two retaining holes for giving space to the first proximity switch and the second proximity switch are provided on the side wall of the housing, and the ends of the first proximity switch and the second proximity switch are respectively inserted in the retaining holes.

9. The stroke-limiting control assembly of claim 8, wherein bumps are arranged on the side walls of the two retaining holes respectively, and the bumps are respectively abutted against the sides of the first proximity switch and the second proximity switch respectively.

10. An operating method of a stroke-limiting control assembly according to claim 9, comprising the steps of:
- a driving the transmission input gear of the stroke-limiting control assembly to rotate in a forward direction;
- driving the transmission gear to rotate with the transmission input gear;
- driving the reel to rotate with the transmission gear;
- driving the film winding to move in a first direction with the reel; and
- keeping the film winding in a stretched state by using the spring of the spring box.

11. An operating method of a stroke-limiting control assembly according to claim 9, further comprising the steps of:
- driving the transmission input gear of the stroke-limiting control assembly to rotate in a backward direction;
- driving the transmission gear to rotate with the transmission input gear;
- driving the reel to rotate with the transmission gear;
- rotating and resetting the spring box by the spring;
- driving the film winding to move in a second direction with the spring box; and
- keeping the film winding in a stretched state by using the spring of the spring box.

12. An operating method of a stroke-limiting control assembly according to claim 8, comprising the steps of:
- a driving the transmission input gear of the stroke-limiting control assembly to rotate in a forward direction;
- driving the transmission gear to rotate with the transmission input gear;
- driving the reel to rotate with the transmission gear;
- driving the film winding to move in a first direction with the reel; and
- keeping the film winding in a stretched state by using the spring of the spring box.

13. An operating method of a stroke-limiting control assembly according to claim 8, further comprising the steps of:
- driving the transmission input gear of the stroke-limiting control assembly to rotate in a backward direction;
- driving the transmission gear to rotate with the transmission input gear;
- driving the reel to rotate with the transmission gear;
- rotating and resetting the spring box by the spring;
- driving the film winding to move in a second direction with the spring box; and
- keeping the film winding in a stretched state by using the spring of the spring box.

14. An operating method of a stroke-limiting control assembly according to claim 1, comprising the steps of:
- a driving the transmission input gear of the stroke-limiting control assembly to rotate in a forward direction;
- driving the transmission gear to rotate with the transmission input gear;
- driving the reel to rotate with the transmission gear;
- driving the film winding to move in a first direction with the reel; and
- keeping the film winding in a stretched state by using the spring of the spring box.

15. An operating method of a stroke-limiting control assembly according to claim 1, further comprising the steps of:
- driving the transmission input gear of the stroke-limiting control assembly to rotate in a backward direction;
- driving the transmission gear to rotate with the transmission input gear, driving the reel to rotate with the transmission gear;
- rotating and resetting the spring box by the spring;
- driving the film winding to move in a second direction with the spring box; and
- keeping the film winding in a stretched state by using the spring of the spring box.

* * * * *